(12) United States Patent
Takahashi

(10) Patent No.: US 12,471,867 B2
(45) Date of Patent: *Nov. 18, 2025

(54) IMAGE PROCESSING DEVICE, IMAGE PROCESSING METHOD, AND IMAGE PROCESSING PROGRAM

(71) Applicant: FUJIFILM Corporation, Tokyo (JP)

(72) Inventor: Tomoyuki Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 18/452,493

(22) Filed: Aug. 18, 2023

(65) Prior Publication Data

US 2024/0081761 A1    Mar. 14, 2024

(30) Foreign Application Priority Data

Sep. 13, 2022   (JP) ................. 2022-145619

(51) Int. Cl.
*A61B 6/50*  (2024.01)
*A61B 5/00*  (2006.01)
*A61B 6/00*  (2006.01)

(52) U.S. Cl.
CPC ............ *A61B 6/505* (2013.01); *A61B 5/4509* (2013.01); *A61B 6/5205* (2013.01); *A61B 6/5252* (2013.01); *G06T 2207/30008* (2013.01)

(58) Field of Classification Search
CPC .......... A61B 5/00; A61B 5/4509; A61B 6/00; A61B 6/505; A61B 6/5205; A61B 6/5252; A61B 6/482; A61B 6/5217; G06N 3/0464; G06N 3/08; G06T 7/0012; G06T 7/62; G06T 7/68; G06T 7/70; G06T 2207/10121; G06T 2207/30008
See application file for complete search history.

(56) References Cited

U.S. PATENT DOCUMENTS

| | | |
|---|---|---|
| 5,931,780 A | 8/1999 | Giger et al. |
| 6,205,348 B1 | 3/2001 | Giger et al. |
| 2016/0140720 A1 | 5/2016 | Naito |
| 2018/0020999 A1 | 1/2018 | Yamamoto |
| 2018/0122094 A1 | 5/2018 | Naito |
| 2021/0369224 A1 | 12/2021 | Okano et al. |
| 2022/0051398 A1 | 2/2022 | Watanabe et al. |
| 2023/0029674 A1* | 2/2023 | Lin ........................ A61B 6/505 |
| 2025/0090119 A1* | 3/2025 | Takahashi ............. G16H 50/20 |

FOREIGN PATENT DOCUMENTS

| | | |
|---|---|---|
| JP | H09-508813 A | 9/1997 |
| JP | 2015-043959 A | 3/2015 |
| WO | 2016/129682 A1 | 8/2016 |
| WO | 2020/054738 A1 | 3/2020 |
| WO | 2020/166561 A1 | 8/2020 |

* cited by examiner

*Primary Examiner* — Jurie Yun
(74) *Attorney, Agent, or Firm* — Studebaker Brackett PLLC

(57) ABSTRACT

A processor, specifies a target bone, which is a target of evaluation, by excluding a fracture and an artificial object in a bone part image in which at least a bone component of a subject is extracted, and derives an evaluation result indicating a state of a bone of the subject based on the target bone.

9 Claims, 14 Drawing Sheets

FIG. 10
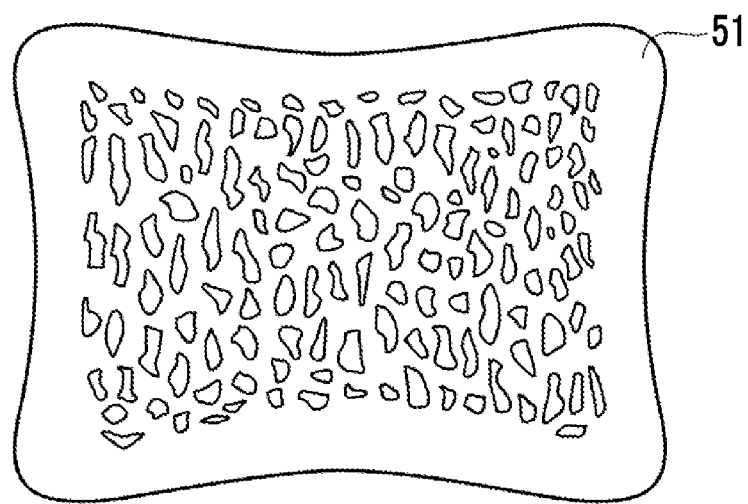
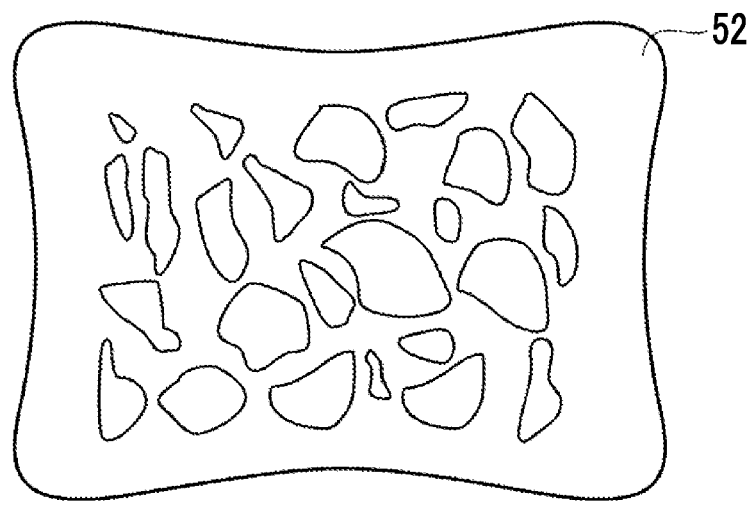

IMAGE PROCESSING DEVICE, IMAGE PROCESSING METHOD, AND IMAGE PROCESSING PROGRAM

CROSS REFERENCE TO RELATED APPLICATIONS

The present application claims priority from Japanese Patent Application No. 2022-145619, filed on Sep. 13, 2022, the entire disclosure of which is incorporated herein by reference.

BACKGROUND

Technical Field

The present disclosure relates to an image processing device, an image processing method, and an image processing program.

Related Art

An osseous system disease, such as osteoporosis, cannot be found from an appearance, and is found after a fracture. In particular, the fractures of a femur and a vertebra, in which the osteoporosis is common, are likely to result in a patient being bedridden. It is known that a 5-year survival rate in a case of the patient who is bedridden is lower than a 5-year survival rate for cancer. Therefore, it is desired to find an osteoporosis patient who needs medical treatment before the fracture occurs.

On the other hand, a dual x-ray absorptiometry (DXA) method is known as one of typical bone mineral quantification methods used for diagnosing a bone density in the osseous system disease. In addition, a method is proposed in which a bone part image showing a bone part of a subject and a soft part image showing a soft part of the subject are acquired by energy subtraction processing, a bone mineral density, that is, a bone density is derived from the bone part image, a muscle mass is derived from the soft part image, and a fracture risk of the subject is evaluated based on the bone mineral density and the muscle mass (see WO2020/166561A). In addition, a method is also proposed in which an evaluation value indicating a fracture risk of a subject is calculated based on a bone density of the subject and a structure parameter that quantifies a characteristic of a spongy structure composed of bone beams (see WO2016/129682A).

In a case of the evaluation of the bone density required for determining the fracture risk by using the bone part image, in a case in which a region including an already fractured bone or an artificial object, such as a screw, used for the medical treatment of the fracture is included, the original correct bone density of the patient cannot be calculated. For example, in a region in which a compression fracture already occurs, the apparent bone density is increased due to the collapse. In addition, since the artificial object is often a material having a higher density than the bone, for example, in a case of obtaining an average value of the bone densities in a certain region, in a case in which the artificial object is included in the region, the bone density is excessively evaluated. In this way, in a case in which the state of the bone cannot be correctly evaluated, the fracture risk, drug efficacy of a drug used for the medical treatment of the osteoporosis, and the like cannot be correctly determined.

SUMMARY OF THE INVENTION

The present disclosure has been made in view of the above circumstances, and is to enable correct evaluation of a state of a bone.

The present disclosure relates to an image processing device comprising at least one processor, in which the processor specifies a target bone, which is a target of evaluation, by excluding a fracture and an artificial object in a bone part image in which at least a bone component of a subject is extracted, and derives an evaluation result indicating a state of a bone of the subject based on the target bone.

The "bone part image in which at least the bone component is extracted" refers to an image in which an object, which has the same degree of radiation attenuation as the bone part, other than the bone part is extracted. Examples of the object having the same degree of attenuation of radiation as the bone part include the artificial object, such as a metal implanted in the bone part.

Note that, in the image processing device according to the present disclosure, the processor may derive the bone part image from a first radiation image and a second radiation image, which are acquired by imaging the subject with radiation having different energy distributions.

In addition, in the image processing device according to the present disclosure, the processor may derive at least one of a bone density of the target bone, information on a microstructure of the target bone, or a relationship with a bone adjacent to the target bone, as an indicator indicating the state of the bone, and may derive the evaluation result based on the indicator.

In addition, in the image processing device according to the present disclosure, the processor may derive a representative value of the bone density in the target bone as the indicator.

In such a case, the processor may derive the representative value of the bone density for each of a plurality of lines in a predetermined direction in the target bone, and may derive a representative value of the representative values of the respective lines as the indicator.

In addition, in the image processing device according to the present disclosure, the processor may display the bone part image in which the target bone is emphasized, and the evaluation result.

The present disclosure relates to an image processing method comprising specifying a target bone, which is a target of evaluation, by excluding a fracture and an artificial object in a bone part image in which at least a bone component of a subject is extracted, and deriving an evaluation result indicating a state of a bone of the subject based on the target bone.

The present disclosure relates to an image processing program causing a computer to execute a procedure of specifying a target bone, which is a target of evaluation, by excluding a fracture and an artificial object in a bone part image in which at least a bone component of a subject is extracted, and a procedure of deriving an evaluation result indicating a state of a bone of the subject based on the target bone.

According to the present disclosure, the state of the bone can be correctly evaluated.

BRIEF DESCRIPTION OF THE DRAWINGS

FIG. 10 is a diagram showing teacher data used for training of a trained model 24A.

DETAILED DESCRIPTION

Figure 1:
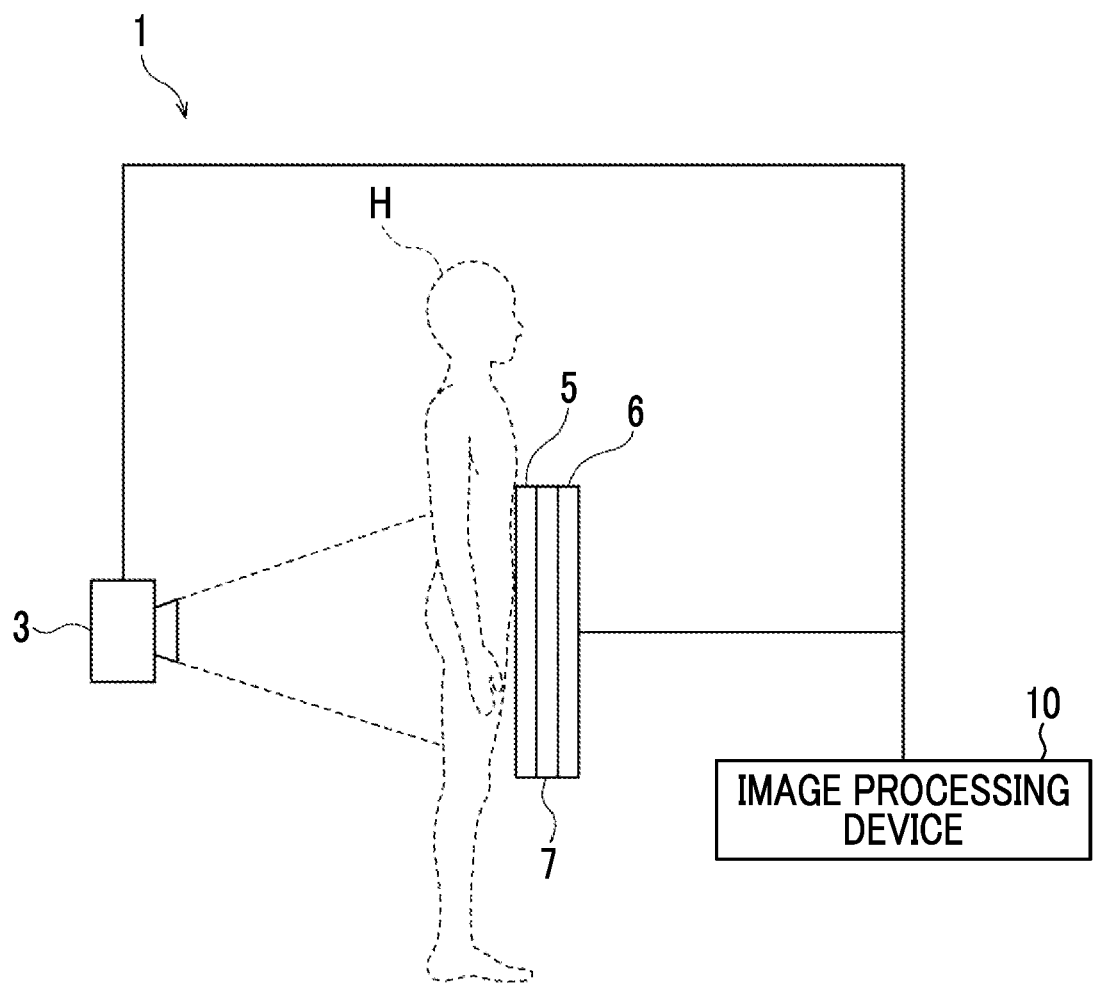
FIG. 1 is a schematic block diagram showing a configuration of a radiography system to which an image processing device according to an embodiment of the present disclosure is applied.

In the following description, an embodiment of the present disclosure will be described with reference to the drawings. FIG. 1 is a schematic block diagram showing a configuration of a radiography system to which an image processing device according to the embodiment of the present disclosure is applied. As shown in FIG. 1, the radiography system according to the present embodiment comprises an imaging apparatus 1 and an image processing device 10 according to the present embodiment.

The imaging apparatus 1 is an imaging apparatus for performing energy subtraction by a so-called one-shot method for converting radiation, such as X-rays, emitted from a radiation source 3 and transmitted through a subject H into energy and irradiating a first radiation detector 5 and a second radiation detector 6 with the converted radiation. During the imaging, as shown in FIG. 1, the first radiation detector 5, a radiation energy conversion filter 7 made of a copper plate or the like, and the second radiation detector 6 are disposed in order from a side closest to the radiation source 3, and the radiation source 3 is driven. Note that the first and second radiation detectors 5 and 6 are closely attached to the radiation energy conversion filter 7.

As a result, in the first radiation detector 5, a first radiation image G1 of the subject H by low-energy radiation also including so-called soft rays is acquired. In addition, in the second radiation detector 6, a second radiation image G2 of the subject H by high-energy radiation from which the soft rays are removed is acquired. The first and second radiation images are input to the image processing device 10.

The first and second radiation detectors 5 and 6 can perform recording and reading-out of the radiation image repeatedly. A so-called direct-type radiation detector that directly receives emission of the radiation and generates an electric charge may be used, or a so-called indirect-type radiation detector that converts the radiation into visible light and then converts the visible light into an electric charge signal may be used. In addition, as a method for reading out a radiation image signal, it is desirable to use a so-called thin film transistor (TFT) readout method in which the radiation image signal is read out by turning a TFT switch on and off, or a so-called optical readout method in which the radiation image signal is read out by emission of read out light. However, other methods may also be used without being limited to these methods.

Figure 2:
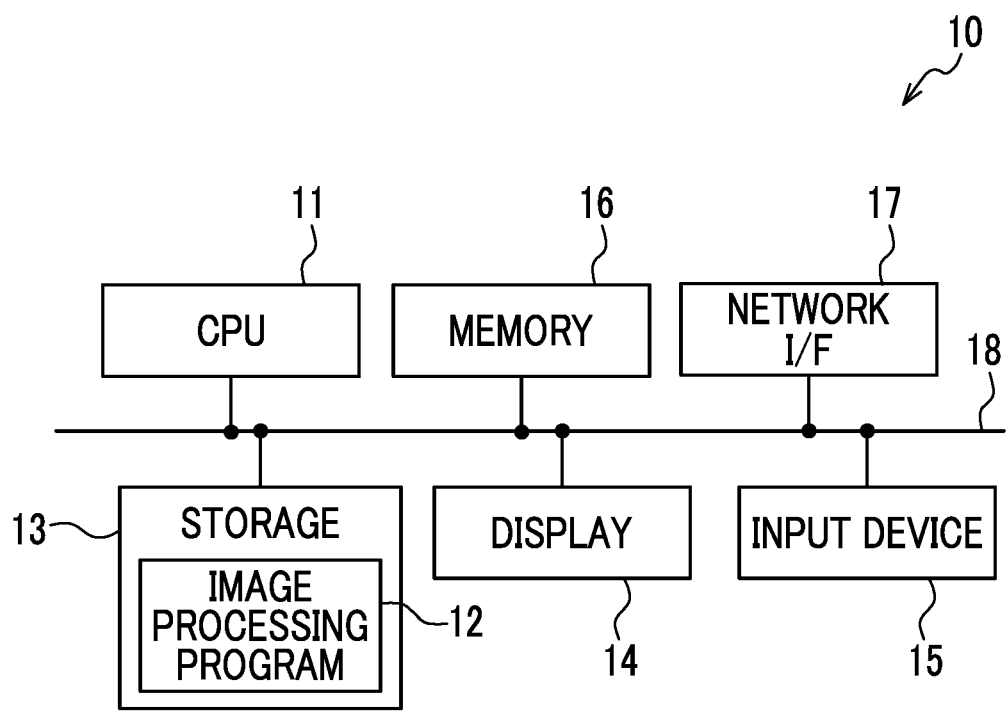
FIG. 2 is a diagram showing a schematic configuration of the image processing device according to the present embodiment.

Then, the image processing device according to the present embodiment will be described. First, a hardware configuration of the image processing device according to the present embodiment will be described with reference to FIG. 2. As shown in FIG. 2, the image processing device 10 is a computer, such as a workstation, a server computer, and a personal computer, and comprises a central processing unit (CPU) 11, a non-volatile storage 13, and a memory 16 as a transitory storage region. In addition, the image processing device 10 comprises a display 14, such as a liquid crystal display, an input device 15, such as a keyboard and a mouse, and a network interface (I/F) 17 connected to a network (not shown). The CPU 11, the storage 13, the display 14, the input device 15, the memory 16, and the network I/F 17 are connected to a bus 18. Note that the CPU 11 is an example of a processor according to the present disclosure.

The storage 13 is realized by a hard disk drive (HDD), a solid state drive (SSD), a flash memory, and the like. An image processing program 12 installed in the image processing device 10 is stored in the storage 13 as a storage medium. The CPU 11 reads out the image processing program 12 from the storage 13, develops the image processing program 12 in the memory 16, and executes the developed image processing program 12.

Note that the image processing program 12 is stored in a storage device of the server computer connected to the network or in a network storage in a state of being accessible from the outside, and is downloaded and installed in the computer that configures the image processing device 10 in response to a request. Alternatively, the image processing program 12 is distributed in a state of being recorded on a recording medium, such as a digital versatile disc (DVD) or a compact disc read only memory (CD-ROM), and is installed in the computer that configures the image processing device 10 from the recording medium.

Figure 3:
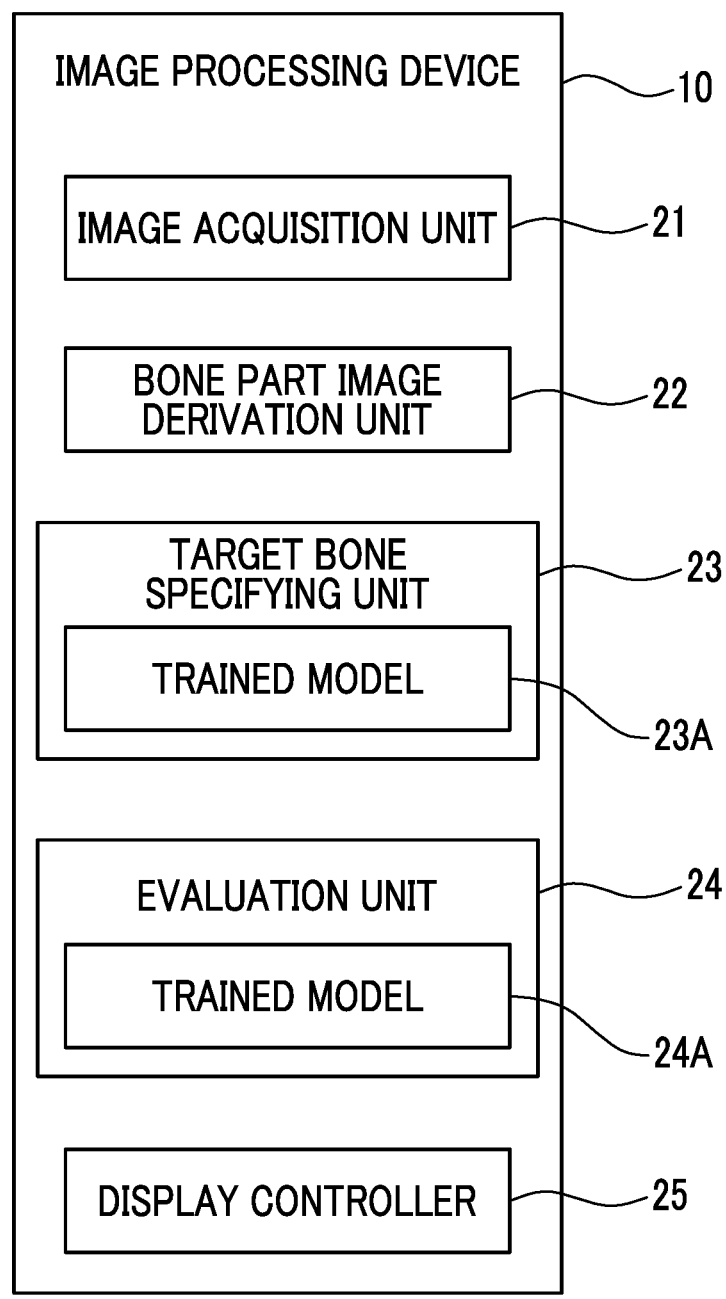
FIG. 3 is a diagram showing a functional configuration of the image processing device according to the present embodiment.

Then, a functional configuration of the image processing device according to the present embodiment will be described. FIG. 3 is a diagram showing the functional configuration of the image processing device according to the present embodiment. As shown in FIG. 3, the image processing device 10 comprises an image acquisition unit 21, a bone part image derivation unit 22, a target bone specifying unit 23, an evaluation unit 24, and a display controller 25. Moreover, by executing the image processing program 12, the CPU 11 functions as the image acquisition unit 21, the bone part image derivation unit 22, the target bone specifying unit 23, the evaluation unit 24, and the display controller 25.

The image acquisition unit 21 acquires the first radiation image G1 and the second radiation image G2 of the subject H from the first and second radiation detectors 5 and 6 by causing the imaging apparatus 1 to perform the energy subtraction imaging of the subject H. In a case in which the first radiation image G1 and the second radiation image G2 are acquired, imaging conditions, such as an imaging dose, a radiation quality, a tube voltage, a source image receptor distance (SID) which is a distance between the radiation source 3 and surfaces of the first and second radiation detectors 5 and 6, a source object distance (SOD) which is a distance between the radiation source 3 and a surface of the subject H, and the presence or absence of a scattered ray removal grid are set.

The SOD and the SID are used to calculate a body thickness distribution as described below. It is preferable that the SOD be acquired by, for example, a time of flight (TOF) camera. It is preferable that the SID be acquired by, for example, a potentiometer, an ultrasound range finder, a laser range finder, or the like.

The imaging conditions need only be set by input from the input device 15 by an operator.

Figure 4:
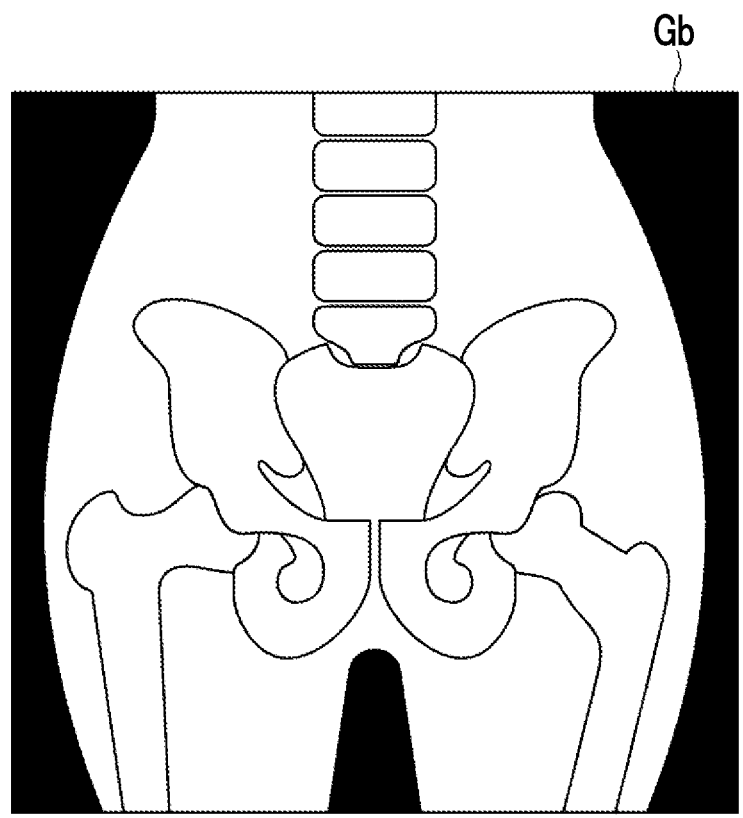
FIG. 4 is a diagram showing a bone part image.

The bone part image derivation unit 22 derives a bone part image Gb in which a bone region of the subject H is extracted from the first radiation image G1 and the second radiation image G2 which are acquired by the image acquisition unit 21. FIG. 4 shows an example of the bone part image Gb derived by the bone part image derivation unit 22. Note that, in general, a femoral neck and a lumbar vertebra are used for the measurement of the bone density. Therefore, the bone part image Gb shown in FIG. 4 shows the bone part image Gb generated from the first radiation image G1 and the second radiation image G2 obtained by performing imaging to include a part of the femoral neck and the lumbar vertebra of the subject H.

The bone part image derivation unit 22 generates the bone part image Gb in which only the bone part of the subject H included in the first radiation image G1 and the second radiation image G2 is extracted by performing weighting subtraction between the corresponding pixels, on the first radiation image G1 and the second radiation image G2, as shown in Expression (1). Note that, in Expression (1), μb is a weighting coefficient determined based on attenuation coefficients of the soft part and the bone part, and x and y are coordinates of each pixel of the bone part image Gb. Note that the bone part image Gb derived by Expression (1) also includes an object having the same degree of the attenuation coefficient as the bone part, in addition to the bone part. Examples of the object having the same degree of the attenuation coefficient as the bone part include a metal implanted in the bone part for the medical treatment of the fracture or the like.

$$Gb(x,y) = G1(x,y) - \mu b \times G2(x,y) \quad (1)$$

Here, each of the first radiation image G1 and the second radiation image G2 includes a scattered ray component based on the radiation scattered in the subject H in addition to a primary ray component of the radiation transmitted through the subject H. Therefore, it is preferable to remove the scattered ray component from the first radiation image G1 and the second radiation image G2. For example, a removal method of the scattered ray component is not particularly limited, but the scattered ray component may be removed from the first radiation image G1 and the second radiation image G2 by applying a method described in JP2015-043959A. In a case in which a method described in JP2015-043959A or the like is used, the derivation of the body thickness distribution of the subject H and the derivation of the scattered ray component for removing the scattered ray component are performed at the same time.

In the following description, the removal of the scattered ray component from the first radiation image G1 will be described, but the removal of the scattered ray component from the second radiation image G2 can also be performed in the same manner. First, the bone part image derivation unit 22 acquires a virtual model of the subject H having an initial body thickness distribution T0(x,y). The virtual model is data virtually representing the subject H of which a body thickness in accordance with the initial body thickness distribution T0(x,y) is associated with a coordinate position of each pixel of the first radiation image G1. Note that the virtual model of the subject H having the initial body thickness distribution T0(x,y) may be stored in the storage 13 of the image processing device 10 in advance. The bone part image derivation unit 22 may calculate a body thickness distribution T(x,y) of the subject H based on the SID and the SOD included in the imaging conditions. In this case, the initial body thickness distribution T0(x,y) can be obtained by subtracting the SOD from the SID.

Next, the bone part image derivation unit 22 generates, based on the virtual model, an image that combines an estimation primary ray image in which a primary ray image obtained by imaging the virtual model is estimated and an estimation scattered ray image in which a scattered ray image obtained by imaging the virtual model is estimated, as an estimation image in which the first radiation image G1 obtained by imaging the subject H is estimated.

Next, the bone part image derivation unit 22 corrects the initial body thickness distribution T0(x,y) of the virtual model such that a difference between the estimation image and the first radiation image G1 is small. The bone part image derivation unit 22 repeatedly performs the generation of the estimation image and the correction of the body thickness distribution until the difference between the estimation image and the first radiation image G1 satisfies a predetermined termination condition. The bone part image derivation unit 22 derives the body thickness distribution in a case in which the termination condition is satisfied as the body thickness distribution T(x,y) of the subject H. In addition, the bone part image derivation unit 22 removes the scattered ray component included in the first radiation image G1 by subtracting the scattered ray component in a case in which the termination condition is satisfied from the first radiation image G1. Then, the bone part image derivation unit 22 derives the bone part image Gb by using the first and second radiation images G1 and G2 from which the scattered ray component is removed.

The target bone specifying unit 23 specifies a target bone that is a target of evaluation. In the present embodiment, the target bone specifying unit 23 specifies the target bone in the bone part image Gb by excluding the fracture and the artificial object. In the present embodiment, the target bone specifying unit 23 specifies the lumbar vertebra as the target bone. For this reason, in the present embodiment, a trained model 23A, which is constructed by subjecting a neural network to machine learning so as to extract a normal lumbar vertebra that does not include the fracture or the artificial object, is used. Note that, even in a case in which the target bone is the femur, a trained model, which is constructed by subjecting the neural network to machine learning so as to extract a normal femur that does not include the fracture or the artificial object, need only be used. In addition, the fracture means a fractured portion, that is, a fracture portion, and "excluding the fracture" means excluding the fractured portion in the bone part image Gb, excluding a region including the fractured portion, or excluding the bone itself including the fractured portion.

Examples of the neural network, which constructs the trained model 23A used in the present embodiment, include a simple perceptron, a multi-layer perceptron, a deep neural network, a convolutional neural network, a deep belief network, a recurrent neural network, and a stochastic neural network. In the present embodiment, for example, the convolutional neural network is used as the neural network.

Figure 5:
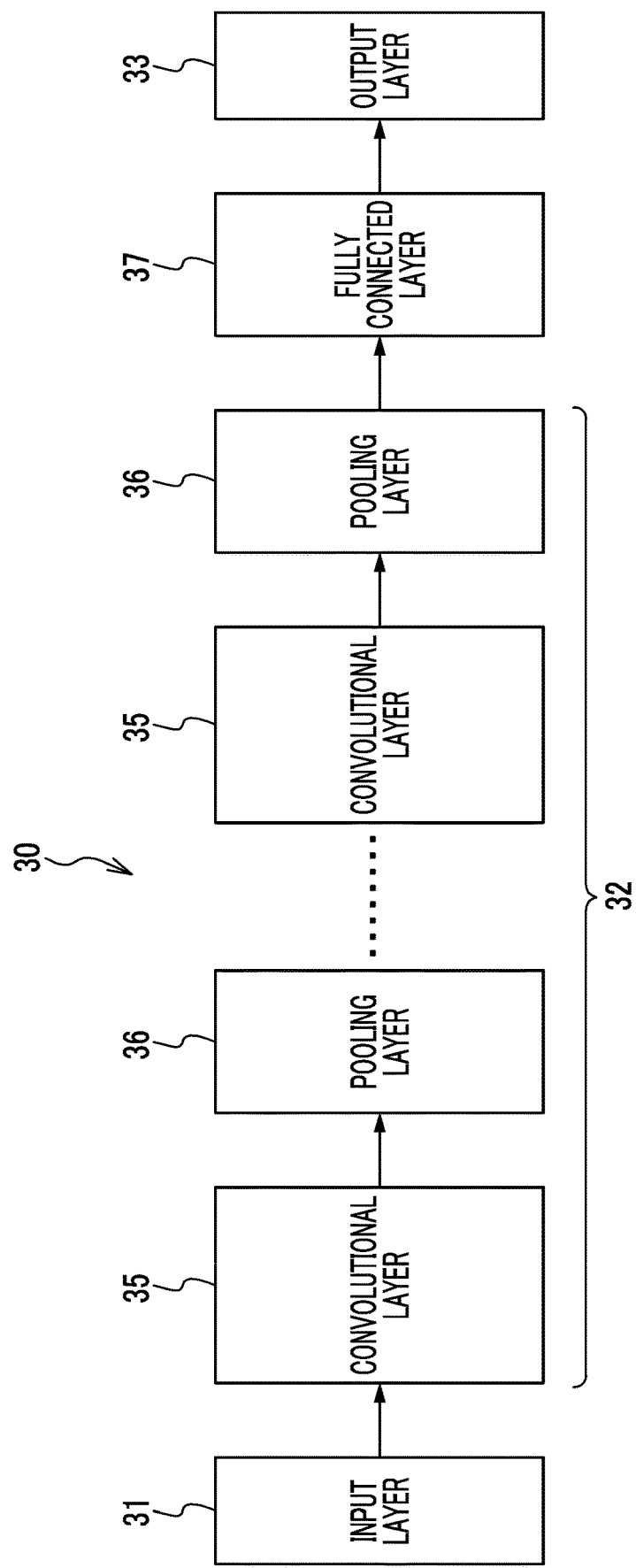
FIG. 5 is a diagram showing an example of a neural network used in the present embodiment.

FIG. 5 is a diagram showing an example of the neural network used in the present embodiment. As shown in FIG. 5, a neural network 30 comprises an input layer 31, an intermediate layer 32, and an output layer 33. The intermediate layer 32 comprises, for example, a plurality of convolutional layers 35, a plurality of pooling layers 36, and a fully connected layer 37. In the neural network 30, the fully connected layer 37 is present in front of the output layer 33. Further, in the neural network 30, the convolutional layer 35 and the pooling layer 36 are alternately disposed between the input layer 31 and the fully connected layer 37.

Note that a configuration of the neural network 30 is not limited to the example of FIG. 5. For example, the neural network 30 may comprise one convolutional layer 35 and one pooling layer 36 between the input layer 31 and the fully connected layer 37.

The trained model 23A is constructed by subjecting the neural network to machine learning by using an image of the lumbar vertebra including only a normal bone as the teacher data for the detection of the fracture and the artificial object.

Figure 6:
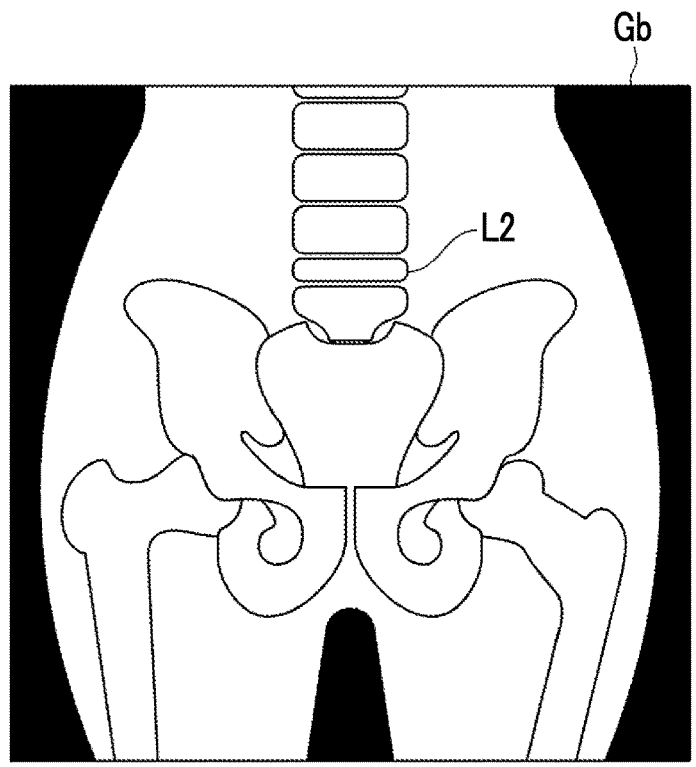
FIG. 6 is a diagram showing a bone part image including a second lumbar vertebra in which a compression fracture occurs.
Figure 7:
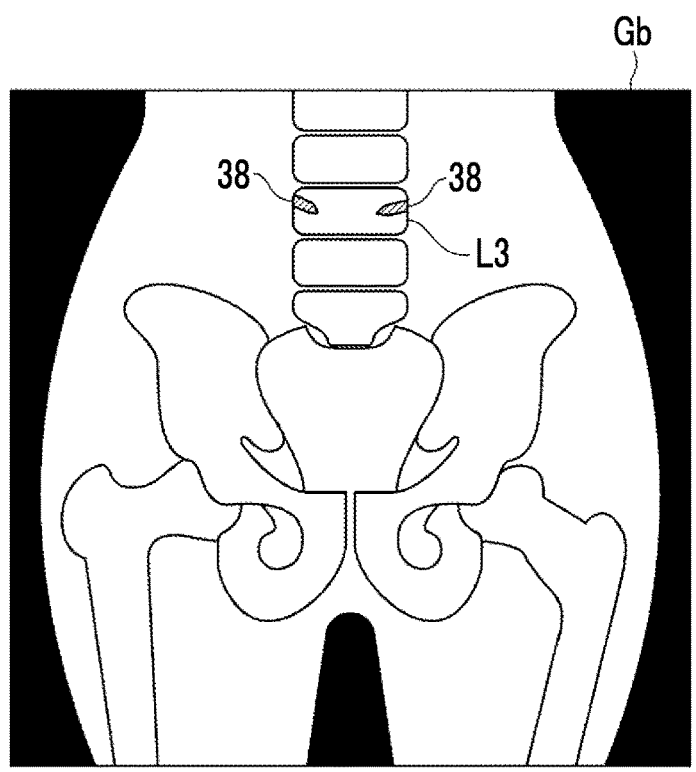
FIG. 7 is a diagram showing a bone part image including an artificial object.

For example, in a case in which the compression fracture occurs in a second lumbar vertebra L2 as shown in FIG. 6, the second lumbar vertebra L2 is deformed to be smaller in a body axis direction, the bone density is further increased, and thus the brightness is higher than that of the normal bone. Further, in a case in which a third lumbar vertebra L3 includes a bolt as shown in FIG. 7, since the bolt is made of a metal, a bolt image 38 has a higher brightness than that of the normal bone.

Figure 8:
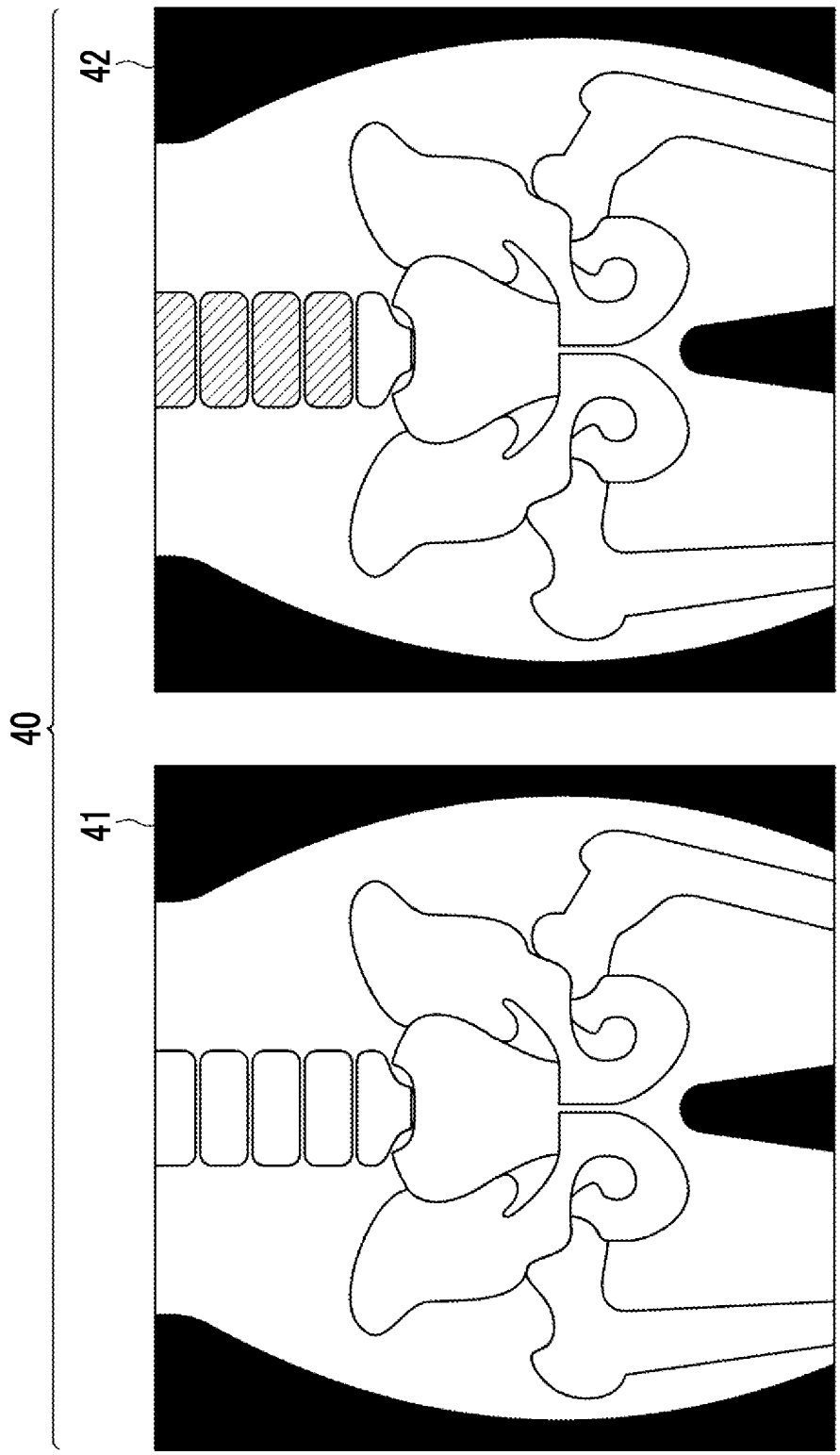
FIG. 8 is a diagram showing teacher data used for training of a trained model 23A.

The trained model 23A extracts the normal lumbar vertebra from the bone part image Gb by learning features of the normal bone. FIG. 8 is a diagram showing the teacher data used for training of the trained model 23A. As shown in FIG. 8, teacher data 40 consists of training data 41 and correct answer data 42. The training data 41 is the bone part image including only the normal lumbar vertebra. The correct answer data 42 is an image in which a region of the normal lumbar vertebra in the training data 41 is masked. Then, by subjecting the neural network to machine learning by using a large amount of such teacher data 40, the trained model 23A is constructed so as to extract the normal lumbar vertebra in a case in which the bone part image is input.

In a case in which the lumbar vertebra is extracted from the bone part image Gb by using such a trained model 23A, the extracted bone is the normal bone that does not include both the fracture and the artificial object. That is, by using such a trained model 23A, a lumbar vertebra other than the second lumbar vertebra L2 in the bone part image Gb shown in FIG. 6 is extracted. In addition, a lumbar vertebra other than the third lumbar vertebra L3 including the artificial object in the bone part image Gb shown in FIG. 7 is extracted. Therefore, the target bone specifying unit 23 specifies the lumbar vertebra, which is detected by the trained model 23A, from among the lumbar vertebrae extracted from the bone part image Gb, as the target bone that does not include the fracture and the artificial object.

Note that the trained model may be constructed so as to extract the fracture or to extract the lumbar vertebra including the artificial object. In such a case, the target bone specifying unit 23 specifies the lumbar vertebra including the fracture or the artificial object in the bone part image Gb by using the trained model constructed as described above, and specifies other lumbar vertebrae as the target bones. In addition, the trained model may be constructed so as to detect only the artificial object from the first radiation image G1 or the second radiation image G2. In such a case, the target bone need only be specified by specifying a region in which the artificial object is present before the bone part image Gb is generated, and excluding the specified region or excluding the bone including the specified region after the bone part image Gb is generated.

Figure 9:
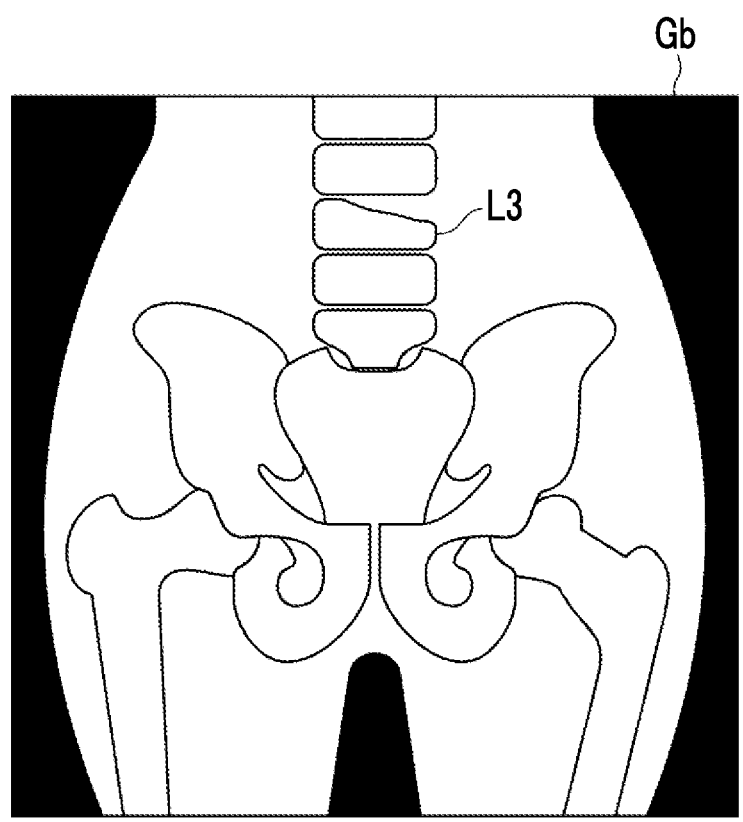
FIG. 9 is a diagram showing a bone part image including a third lumbar vertebra in which a compression fracture occurs.

In addition, the target bone specifying unit 23 may specify the target bone based on a shape of the lumbar vertebra. For example, the lumbar vertebra has a shape that is left-right symmetric with respect to a center line in the body axis direction as viewed from the front side, but the left-right symmetry is lost in a case in which the compression fracture occurs in the third lumbar vertebra L3 as shown in FIG. 9. Therefore, the target bone specifying unit 23 may derive an indicator indicating the left-right symmetry of the lumbar vertebra extracted from the bone part image Gb, may specify the lumbar vertebra in which the left-right symmetry is lost based on the indicator, and may specify the lumbar vertebra other than the specified lumbar vertebra as the target bone. Here, a distance from the center line of the extracted lumbar vertebra in the body axis direction to the left and right outer contours of the lumbar vertebra can be derived, and a difference between a distance in the right direction from the center line and a distance in the left direction from the center line can be used as the indicator indicating the left-right symmetry. In a case in which the indicator indicating the left-right symmetry is larger than a predetermined threshold value, there is a high possibility that the fracture occurs in the lumbar vertebra, and thus the lumbar vertebra can be prevented from being specified as the target bone. Note that, as the indicator indicating the left-right symmetry, a difference between the left and right bone region areas of the center line in the body axis direction may be used.

In addition, the target bone specifying unit 23 may derive a difference in area between each of the lumbar vertebrae extracted from the bone part image Gb and at least one of an upper lumbar vertebra or a lower lumbar vertebra, and may specify the target bone based on the difference. Here, a size of the lumbar vertebra included in the bone part image Gb is substantially the same as the sizes of the lumbar vertebrae vertically adjacent to the lumbar vertebra. On the other hand, in a case in which the compression fracture occurs, a height of the lumbar vertebra is smaller than heights of the lumbar vertebrae vertically adjacent to the lumbar vertebra. Therefore, the target bone specifying unit 23 may derive the difference in area between each of the lumbar vertebrae extracted from the bone part image Gb and, for example, the upper lumbar vertebra, and may not specify the lumbar vertebra, in which it is assumed that the compression fracture occurs, as the target bone in a case in which the difference is equal to or less than a predetermined threshold value.

In addition, the target bone specifying unit 23 may derive a ratio between the height and the width for each of the lumbar vertebrae extracted from the bone part image Gb, and may specify the target bone based on a comparison result of the ratio between the height and the width derived for the upper and lower lumbar vertebrae. Here, a size of the lumbar vertebra included in the bone part image Gb is substantially the same as the sizes of the lumbar vertebrae vertically adjacent to the lumbar vertebra. On the other hand, in a case in which the compression fracture occurs as shown in FIG. 6, the ratio between the height and the width of the lumbar vertebra is significantly different from the ratio between the height and the width of the normal lumbar vertebra. Therefore, the target bone specifying unit 23 may derive the difference in ratio between each of the lumbar vertebrae extracted from the bone part image Gb and, for example, the upper lumbar vertebra, and may not specify the lumbar vertebra, in which it is assumed that the compression fracture occurs, as the target bone in a case in which the difference is equal to or larger than a predetermined threshold value.

The evaluation unit 24 derives an evaluation result indicating a state of the bone of the subject H based on the target bone. In the present embodiment, the evaluation unit 24 includes a trained model 24A that outputs the evaluation value indicating the likelihood of osteoporosis in a case in which the distribution of the pixel values of the image of the region of the target bone, that is, the target bone in the bone part image Gb is input. The trained model 24A is constructed by subjecting the neural network to machine learning by using, as the teacher data, an image (hereinafter, referred to as an image of the normal lumbar vertebra) of the lumbar vertebra extracted from the bone part image of the patient who does not have the osteoporosis and an image of the lumbar vertebra of the lumbar vertebra of the osteoporosis patient. FIG. 10 is a diagram showing an example of the teacher data for training the trained model 24A. As shown in FIG. 10, as the teacher data for training the trained model 24A, first teacher data 51 representing the normal lumbar vertebra and second teacher data 52 representing the lumbar vertebra with the osteoporosis are used. The normal lumbar vertebra has a dense microstructure of the bone beam, whereas the lumbar vertebra with the osteoporosis has a coarser microstructure of the bone beam as compared with the normal lumbar vertebra.

The neural network is subjected to machine learning so that the output in a case in which the first teacher data 51 is input is 0, and is subjected to machine learning so that the output in a case in which the second teacher data 52 is input is 1. As a result, the trained model 24A is constructed to output the evaluation value having a value close to 1 in a case in which the input image of the lumbar vertebra is the osteoporosis. In such a case, the neural network learns the distribution of the pixel values of the image of the lumbar vertebra and the microstructure of the bone beam, and as a result, the trained model 24A is constructed to output the evaluation value indicating the likelihood of osteoporosis from the distribution of the pixel values of the image of the lumbar vertebra and the microstructure.

Note that the evaluation unit 24 may use the evaluation value itself output by the trained model 24A as the evaluation result, or may use the presence or absence of the osteoporosis as the evaluation result by comparing the evaluation value with the threshold value.

In addition, the evaluation unit 24 may derive the bone density of the target bone, and may derive the evaluation result based on the bone density. In such a case, the evaluation unit 24 derives the bone density $B(x,y)$ corresponding to each pixel by converting each pixel value $Gb(x,y)$ of the region of the target bone in the bone part image Gb into the pixel value of the bone part image in a case of being acquired under a standard imaging condition. Specifically, the evaluation unit 24 derives the bone density $B(x,y)$ for each pixel by correcting each pixel value $Gb(x,y)$ of the region of the target bone in the bone part image Gb by using the correction coefficient acquired from a look-up table (not shown) described below.

Here, a contrast between a soft part and a bone part in the radiation image is lower as the tube voltage in the radiation source 3 is higher and the energy of the radiation emitted from the radiation source 3 is higher. In addition, in a procedure of the radiation transmitted through the subject H, a low-energy component of the radiation is absorbed by the subject H, and beam hardening occurs in which the radiation energy is increased. The increase in the radiation energy due to the beam hardening is larger as the body thickness of the subject H is larger.

Figure 11:
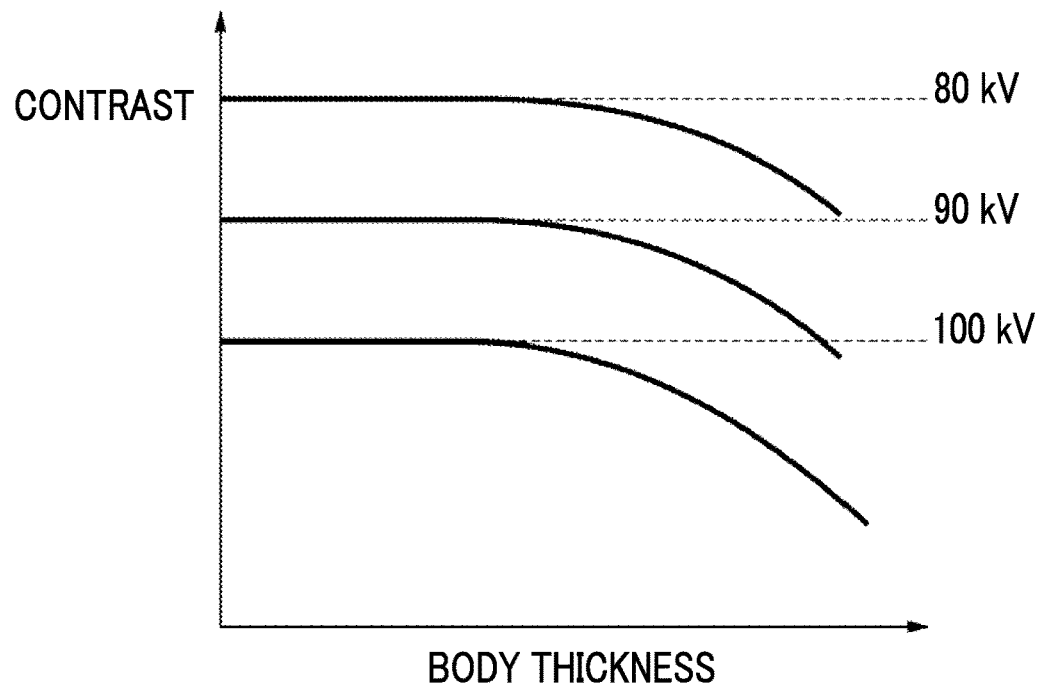
FIG. 11 is a diagram showing a relationship between a contrast between a bone part and a soft part and a body thickness.

FIG. 11 is a diagram showing a relationship between the contrast between the bone part and the soft part and the body thickness of the subject H. Note that FIG. 11 shows the relationship between the contrast between the bone part and the soft part and the body thickness of the subject H at the three tube voltages of 80 kV, 90 kV, and 100 kV. As shown in FIG. 11, the contrast is lower as the tube voltage is higher. In addition, in a case in which the body thickness of the subject H exceeds a certain value, the contrast is lower as the body thickness is larger. Note that contrast between the bone part and the soft part is higher as the pixel value $Gb(x,y)$ of the bone region in the bone part image Gb is larger. Therefore, the relationship shown in FIG. 11 shifts to a higher contrast side as the pixel value $Gb(x,y)$ of the bone region in the bone part image Gb is increased.

In the present embodiment, the look-up table (not shown) for acquiring the correction coefficient for correcting the difference in the contrast depending on the tube voltage during the imaging and the decrease in the contrast due to the influence of the beam hardening in the bone part image Gb is stored in the storage 13. The correction coefficient is a coefficient for correcting each pixel value $Gb(x,y)$ of the bone part image Gb.

Figure 12:
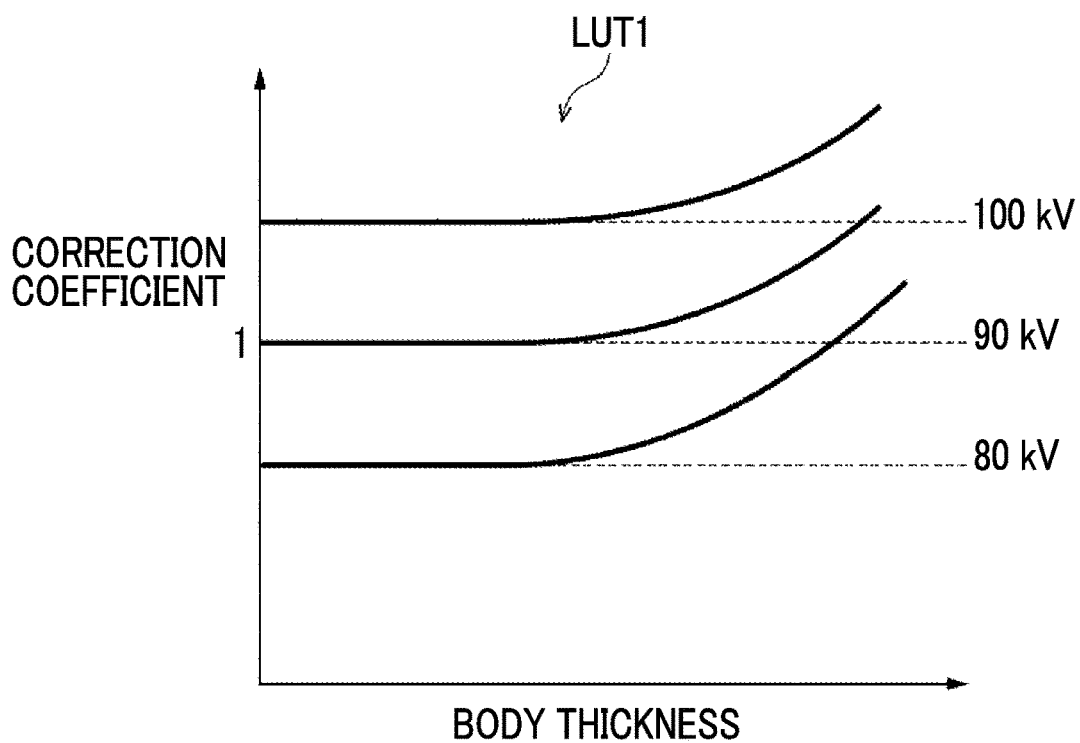
FIG. 12 is a diagram showing an example of a look-up table for acquiring a correction coefficient.

FIG. 12 is a diagram showing an example of the look-up table stored in the storage 13. In FIG. 12, a look-up table LUT1 in which the standard imaging condition is set to the tube voltage of 90 kV is shown. As shown in FIG. 12, in the look-up table LUT1, the correction coefficient is set to be larger as the tube voltage is higher and the body thickness of the subject is larger. In the example shown in FIG. 12, since the standard imaging condition is the tube voltage of 90 kV, the correction coefficient is 1 in a case in which the tube voltage is 90 kV and the body thickness is 0. Note that although the look-up table LUT1 is shown in two dimensions in FIG. 12, the correction coefficient differs depending on the pixel value of the bone region. Therefore, the look-up table LUT1 is actually a three-dimensional table to which an axis representing the pixel value of the bone region is added.

The evaluation unit 24 extracts the body thickness distribution $T(x,y)$ of the subject H and a correction coefficient $C0(x,y)$ for each pixel depending on the imaging condition including a set value of the tube voltage stored in the storage 13 from the look-up table LUT1. Moreover, as shown in Expression (2), the evaluation unit 24 multiplies each pixel value $Gb(x,y)$ of the region of the target bone in the bone part image Gb by the correction coefficient $C0(x,y)$ to derive a bone density $B(x,y)$ for each pixel of the region of the target bone. As a result, the bone density image B having the bone density $B(x,y)$ as the pixel value is derived. The bone density $B(x,y)$ derived in this way is acquired by imaging the subject H by the tube voltage of 90 kV, which is the standard imaging condition, and represents the pixel value of the bone part in the bone region included in the radiation image from which the influence of the beam hardening is removed.

$$B(x,y)=C0(x,y) \times Gb(x,y) \qquad (2)$$

Note that the evaluation unit 24 may derive a low frequency component of each pixel of the bone part image Gb, and may derive the bone density B(x,y) based on the low frequency component.

Then, the evaluation unit 24 derives a representative value of the bone density B(x,y) of each pixel of the region of the target bone as the evaluation result. A total value, an average value, a median value, a maximum value, or a minimum value can be used as the representative value. In addition, in a case in which there are a plurality of target bones, the evaluation result may be derived for each target bone, or a representative value of the representative values of the respective target bones may be derived as the evaluation result. Note that the representative value is an example of an indicator indicating the state of the bone.

In addition, a result of determining the presence or absence of the osteoporosis by using the representative value of the bone density may be used as the evaluation result. In such a case, the evaluation unit 24 need only determine that the osteoporosis is present in a case in which the representative value of the bone density is equal to or less than a predetermined threshold value. Here, in a case in which the bone density is equal to or less than 70% of a young adult mean (YAM) value, it is determined that the osteoporosis is present. Therefore, as the threshold value, a value corresponding to 70% of the YAM value need only be used.

Here, in a case in which the sum of the bone densities of the respective pixels of the region of the target bone is derived as the evaluation result of the target bone, the evaluation result corresponds to a bone mass of the target bone. However, in a case in which a local contour of the target bone deviates from an original contour, the sum of the bone densities fluctuates. On the other hand, in a case in which the average of the bone densities of the respective pixels of the region of the target bone is derived, even in a case in which the local contour of the target bone deviates from the original contour, the influence on the evaluation result is small. However, in a case in which the positioning during the imaging deviates and the lumbar vertebra rotates about a central axis in the body axis direction with respect to an imaging direction, the area of the lumbar vertebra in the bone part image Gb fluctuates or the pixel value fluctuates, so that the average value fluctuates.

Figure 13:
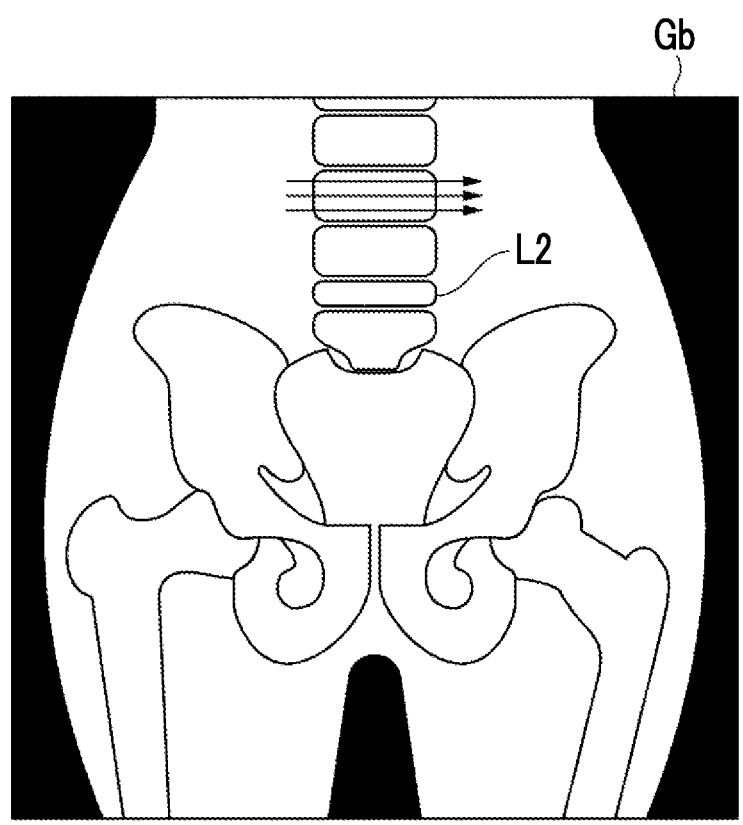
FIG. 13 is a diagram for describing the derivation of a representative value of a bone density for each line.

Therefore, the evaluation unit 24 may derive the representative value for each line of the bone density in an x direction or a y direction of the region of the target bone, and may derive the representative value of the representative values of the respective lines as the evaluation result. For example, as shown in FIG. 13, in the x direction of the third lumbar vertebra L3, the sum of the bone densities may be derived to reduce the influence of the area fluctuation due to the deviation of the positioning in the body axis direction, that is, the y direction, the average of the sum of the bone densities may be derived to reduce the influence of the deviation of the contour in the y direction, and the results may be used as the evaluation results. Note that, in a case in which the average of the sum of the bone densities for each line is derived, a deviation value that greatly deviates from the sum of the bone densities of the respective lines may be excluded. In addition, in a case in which the sum of the bone densities of the respective lines is too large or too small, there is a possibility that the target bone is not correctly detected. Therefore, for example, 20% above and below the sum of the bone densities of the respective lines may be excluded from the average calculation.

In addition, in a case of constructing the trained model 24A as described above, the bone density image may be used as the teacher data. In such a case, the trained model 24A need only be constructed so as to output the evaluation value indicating a likelihood of osteoporosis by inputting the bone density image of the region of the target bone.

In addition, the evaluation unit 24 may extract a spongy bone region of the target bone in the bone density image, and may derive a dispersion value of the bone density in the spongy bone region as the evaluation result. Here, the dispersion value of the bone density in the spongy bone region is the evaluation value indicating a degree of coarseness and fineness of the microstructure of the bone beam. The dispersion value of the bone density is an example of an indicator indicating the state of the bone.

Figure 14:
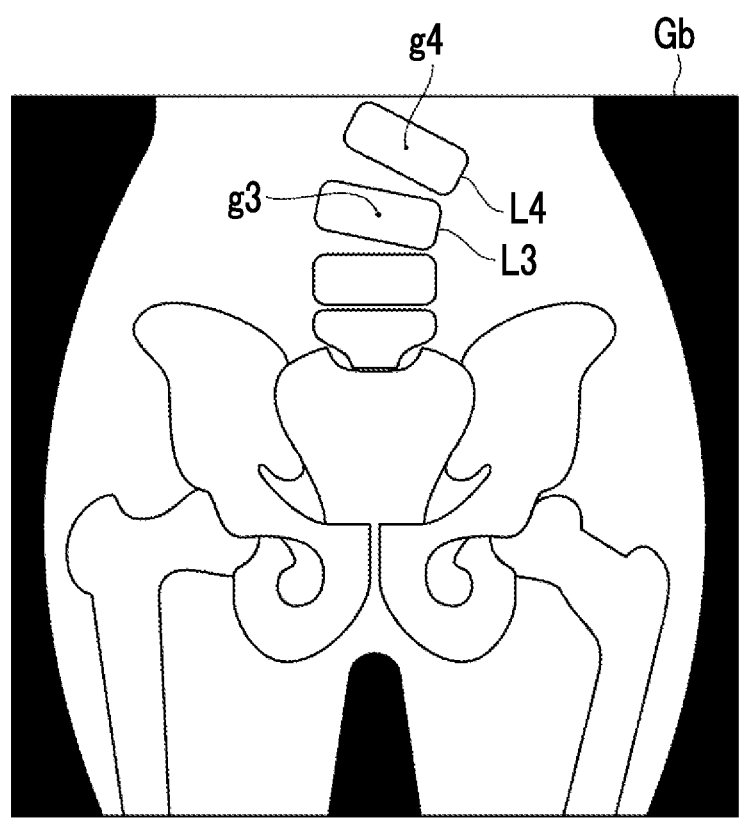
FIG. 14 is a diagram for describing the derivation of an evaluation result of a positional relationship between bones.

In addition, the evaluation unit 24 may derive a positional relationship between the target bone and the bone adjacent to the target bone as the evaluation result. For example, as shown in FIG. 14, the lumbar vertebra L3 is the target bone in the bone part image Gb of the patient with scoliosis. Then, the evaluation unit 24 derives a centroid g3 of the lumbar vertebra L3 and a centroid g4 of a lumbar vertebra L4 above the lumbar vertebra L3, and derives a difference value between the positions of the centroids g3 and g4 in the x direction. Further, in a case in which the difference value between the positions is equal to or larger than a predetermined threshold value, the force is not evenly applied from the vertebra above the target bone, so that the evaluation result that the fracture risk is high may be output. Also, the difference value itself may be used as the evaluation result of the positional relationship. The difference value is an example of an indicator indicating the state of the bone.

In addition, the evaluation unit 24 may derive the evaluation value indicating the likelihood of osteoporosis as the evaluation result, based on the representative value of the bone density, the dispersion value of the bone density, and the evaluation result of the positional relationship (that is, the difference value between the positions of the centroids g3 and g4 in the x direction). In such a case, a method can be used in which the representative value of the bone density, the dispersion value of the bone density, and the evaluation result of the positional relationship are used as multidimensional vectors, and a boundary on a multidimensional plane for discriminating whether or not the osteoporosis is present is set by machine learning. In such a case, by subjecting the neural network to machine learning by using, as the teacher data, the representative value of the bone density, the dispersion value of the bone density, and the evaluation result of the positional relationship in a case of the osteoporosis, and the representative value of the bone density, the dispersion value of the bone density, and the evaluation result of the positional relationship in a normal case, it is possible to construct the trained model for determining whether or not the osteoporosis is present from the multidimensional vectors.

Figure 15:
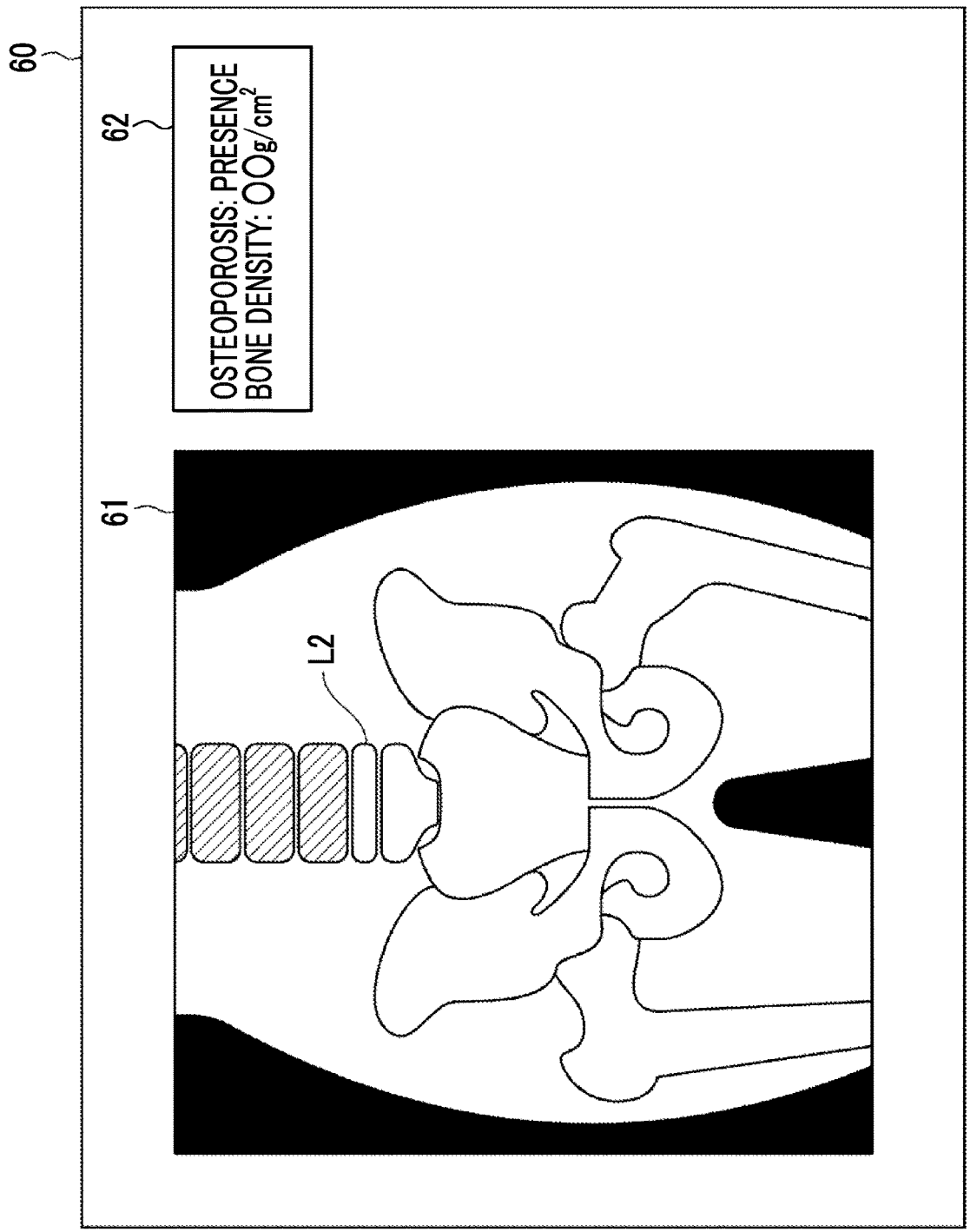
FIG. 15 is a diagram showing a display screen of the evaluation result.

The display controller 25 displays the evaluation result derived by the evaluation unit 24 on the display 14. FIG. 15 is a diagram showing a display screen of the evaluation result. As shown in FIG. 15, a bone density image 61 and an evaluation result 62 are displayed on a display screen 60. The bone part image Gb may be displayed instead of the bone density image 61. Note that, as the evaluation result 62, the presence or absence of the osteoporosis and the representative value (unit: $g/cm^2$) of the bone density of the target bone are displayed.

As shown in FIG. 15, the target bone from which the evaluation result is derived is emphasized in the bone density image 61. That is, the lumbar vertebra other than the second lumbar vertebra L2 in which the compression fracture occurs is emphasized. Note that, in FIG. 15, the target bone is emphasized by adding hatching to the target bone, but the present disclosure is not limited to this. The target bone may be emphasized by surrounding the target bone with a line, adding a color, or the like.

Figure 16:
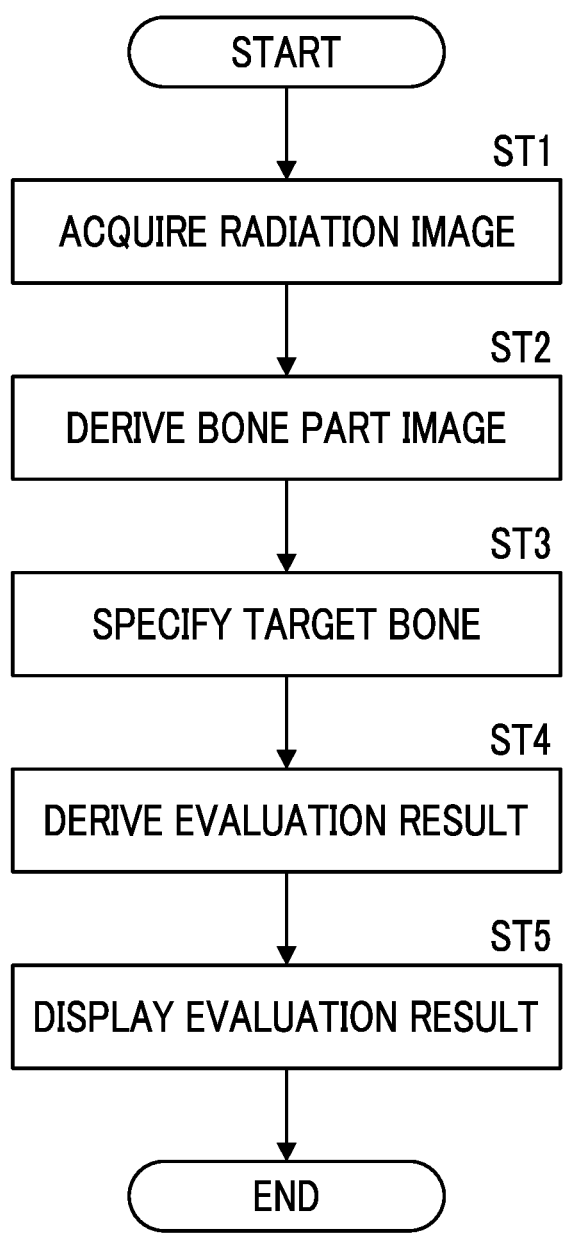
FIG. 16 is a flowchart showing processing performed in the present embodiment.

Then, processing performed in the present embodiment will be described. FIG. 16 is a flowchart showing processing performed in the present embodiment. First, the image acquisition unit 21 causes the imaging apparatus 1 to perform imaging to acquire the first and second radiation images G1 and G2 having different energy distributions from each other (step ST1). Then, the bone part image derivation unit 22 derives the bone part image Gb showing the bone region of the subject H from the first radiation image G1 and the second radiation image G2 which are acquired by the image acquisition unit 21 (step ST2).

Subsequently, the target bone specifying unit 23 specifies the target bone, which is the target of evaluation, by excluding the fracture and the artificial object in the bone part image Gb (step ST3). Then, the evaluation unit 24 derives the evaluation result indicating the state of the bone of the subject H based on the target bone (step ST4). Further, the display controller 25 displays the evaluation result (step ST5), and terminates the processing.

As described above, in the present embodiment, the target bone is specified by excluding the fracture and the artificial object, and the evaluation result indicating the state of the bone of the subject H is derived based on the target bone. Therefore, it is possible to correctly evaluate the state of the bone of the subject H without being affected by the fracture or the artificial object.

Note that the evaluation unit 24 may evaluate the evaluation result of the same subject over time. For example, in the patient who receives medication for the medical treatment of the osteoporosis, the drug efficacy may be evaluated by comparing a past evaluation result with the latest evaluation result.

Also, the evaluation unit 24 may further derive the fracture risk as the evaluation result. In such a case, for example, as described in JP1997-508813A (JP-H09-508813A), it is possible to use a method of deriving a fracture risk by using a trained model. In addition, as described in WO2020/054738A, a method of deriving a fracture probability by using an arithmetic expression or the like can be used.

Note that, in the embodiment described above, the first and second radiation images G1 and G2 are acquired by the one-shot method in a case in which the energy subtraction processing is performed, but the present disclosure is not limited to this. The first and second radiation images G1 and G2 may be acquired by a so-called two-shot method in which imaging is performed twice by using only one radiation detector. In a case of the two-shot method, there is a possibility that a position of the subject H included in the first radiation image G1 and the second radiation image G2 deviates due to a body movement of the subject H. Therefore, in the first radiation image G1 and the second radiation image G2, it is preferable to perform the processing according to the present embodiment after registration of the subject is performed.

In addition, in the embodiment described above, the visceral fat mass distribution is derived by using the first and second radiation images acquired by the system that images the subject H by using the first and second radiation detectors 5 and 6, but the visceral fat mass distribution may be derived by using the first and second radiation images G1 and G2 acquired by using an accumulative phosphor sheet instead of the radiation detector. In this case, the first and second radiation images G1 and G2 need only be acquired by stacking two accumulative phosphor sheets, emitting the radiation transmitted through the subject H, accumulating and recording radiation image information of the subject H in each of the accumulative phosphor sheets, and photoelectrically reading the radiation image information from each of the accumulative phosphor sheets. Note that the two-shot method may also be used in a case in which the first and second radiation images G1 and G2 are acquired by using the accumulative phosphor sheet.

In addition, the radiation in the embodiment described above is not particularly limited, and $\alpha$-rays or $\gamma$-rays can be used in addition to X-rays.

In addition, in the embodiment described above, various processors shown below can be used as the hardware structures of processing units that execute various pieces of processing, such as the image acquisition unit 21, the bone part image derivation unit 22, the target bone specifying unit 23, the evaluation unit 24, and the display controller 25. As described above, the various processors include, in addition to the CPU that is a general-purpose processor which executes software (program) and functions as various processing units, a programmable logic device (PLD) that is a processor whose circuit configuration can be changed after manufacture, such as a field programmable gate array (FPGA), and a dedicated electrical circuit that is a processor having a circuit configuration which is designed for exclusive use in order to execute specific processing, such as an application specific integrated circuit (ASIC).

One processing unit may be configured by one of these various processors, or may be configured by a combination of two or more processors of the same type or different types (for example, a combination of a plurality of FPGAs or a combination of the CPU and the FPGA). In addition, a plurality of the processing units may be configured by one processor.

As an example of configuring the plurality of processing units by one processor, first, as represented by a computer of a client, a server, and the like there is an aspect in which one processor is configured by a combination of one or more CPUs and software and this processor functions as a plurality of processing units. Second, as represented by a system on chip (SoC) or the like, there is an aspect of using a processor that realizes the function of the entire system including the plurality of processing units by one integrated circuit (IC) chip. In this way, as the hardware structure, the various processing units are configured by using one or more of the various processors described above.

Further, as the hardware structures of these various processors, more specifically, it is possible to use an electrical circuit (circuitry) in which circuit elements, such as semiconductor elements, are combined.

The supplementary notes of the present disclosure will be described below.

Supplementary Note 1

An image processing device comprising at least one processor, in which the processor specifies a target bone, which is a target of evaluation, by excluding a fracture and an artificial object in a bone part image in which at least a bone component of a subject is extracted, and derives an evaluation result indicating a state of a bone of the subject based on the target bone.

Supplementary Note 2

The image processing device according to supplementary note 1, in which the processor derives the bone part image from a first radiation image and a second radiation image, which are acquired by imaging the subject with radiation having different energy distributions.

Supplementary Note 3

The image processing device according to supplementary note 1 or 2, in which the processor derives at least one of a bone density of the target bone, information on a microstructure of the target bone, or a relationship with a bone adjacent to the target bone, as an indicator indicating the state of the bone, and derives the evaluation result based on the indicator.

Supplementary Note 4

The image processing device according to supplementary note 3, in which the processor derives a representative value of the bone density in the target bone as the indicator.

Supplementary Note 5

The image processing device according to supplementary note 4, in which the processor derives the representative value of the bone density for each of a plurality of lines in a predetermined direction in the target bone, and derives a representative value of the representative values of the respective lines as the indicator.

Supplementary Note 6

The image processing device according to any one of supplementary notes 1 to 5, in which the processor displays the bone part image in which the target bone is emphasized, and the evaluation result.

Supplementary Note 7

An image processing method comprising specifying a target bone, which is a target of evaluation, by excluding a fracture and an artificial object in a bone part image in which at least a bone component of a subject is extracted, and deriving an evaluation result indicating a state of a bone of the subject based on the target bone.

Supplementary Note 8

An image processing program causing a computer to execute a procedure of specifying a target bone, which is a target of evaluation, by excluding a fracture and an artificial object in a bone part image in which at least a bone component of a subject is extracted, and a procedure of deriving an evaluation result indicating a state of a bone of the subject based on the target bone.

What is claimed is:

1. An image processing device comprising:
at least one processor,
wherein the processor
specifies a target bone, which is a target of evaluation, by excluding a fracture and an artificial object in a bone part image in which at least a bone component of a subject is extracted,
derives an evaluation result indicating a state of a bone of the subject based on the target bone, and
derives a relationship with a bone adjacent to the target bone, as an indicator indicating the state of the bone, and derives the evaluation result based on the indicator.

2. The image processing device according to claim 1, wherein the processor derives the bone part image from a first radiation image and a second radiation image, which are acquired by imaging the subject with radiation having different energy distributions.

3. The image processing device according to claim 1, wherein the processor derives at least one of a bone density of the target bone or information on a microstructure of the target bone, as the indicator indicating the state of the bone, and derives the evaluation result based on the indicator.

4. The image processing device according to claim 3, wherein the processor derives a representative value of the bone density in the target bone as the indicator.

5. The image processing device according to claim 4, wherein the processor derives the representative value of the bone density for each of a plurality of lines in a predetermined direction in the target bone, and derives a representative value of the representative values of the respective lines as the indicator.

6. The image processing device according to claim 1, wherein the processor displays the bone part image in which the target bone is emphasized, and the evaluation result.

7. The image processing device according to claim 1, wherein the processor derives a difference value between a centroid of the target bone and a centroid of the bone adjacent to the target bone in a predetermined direction as the relationship with the bone adjacent to the target bone.

8. An image processing method comprising:
specifying a target bone, which is a target of evaluation, by excluding a fracture and an artificial object in a bone part image in which at least a bone component of a subject is extracted;
deriving an evaluation result indicating a state of a bone of the subject based on the target bone; and
deriving a relationship with a bone adjacent to the target bone, as an indicator indicating the state of the bone, and derives the evaluation result based on the indicator.

9. A non-transitory computer-readable storage medium that stores an image processing program causing a computer to execute:
a procedure of specifying a target bone, which is a target of evaluation, by excluding a fracture and an artificial object in a bone part image in which at least a bone component of a subject is extracted;
a procedure of deriving an evaluation result indicating a state of a bone of the subject based on the target bone; and
a procedure of deriving a relationship with a bone adjacent to the target bone, as an indicator indicating the state of the bone, and derives the evaluation result based on the indicator.

* * * * *